United States Patent
Boisselle et al.

(10) Patent No.: US 8,752,403 B2
(45) Date of Patent: Jun. 17, 2014

(54) METHOD OF SHAPING GLASS SHEETS

(75) Inventors: Robert J. Boisselle, Maumee, OH (US); Efrain Serrano, Perrysburg, OH (US); John Tomik, LaSalle, MI (US)

(73) Assignee: Pilkington Group Limited, St. Helens (GB)

( * ) Notice: Subject to any disclaimer, the term of this patent is extended or adjusted under 35 U.S.C. 154(b) by 103 days.

(21) Appl. No.: 13/105,079

(22) Filed: May 11, 2011

(65) Prior Publication Data

US 2011/0277509 A1  Nov. 17, 2011

Related U.S. Application Data

(60) Provisional application No. 61/333,905, filed on May 12, 2010.

(51) Int. Cl.
  *C03B 23/033* (2006.01)
  *C03B 35/16* (2006.01)

(52) U.S. Cl.
  CPC ............. *C03B 23/033* (2013.01); *C03B 35/163* (2013.01); *C03B 35/161* (2013.01)
  USPC .................................... 65/106; 65/102; 65/63

(58) Field of Classification Search
  CPC .... C03B 23/033; C03B 35/163; C03B 35/161
  USPC ............................................... 65/106, 63, 102
  See application file for complete search history.

(56) References Cited

U.S. PATENT DOCUMENTS

| | | | |
|---|---|---|---|
| 3,545,951 A | 12/1970 | Nedelec | |
| 4,054,037 A | 10/1977 | Yoder | |
| 4,123,246 A | 10/1978 | Johnson | |
| 4,292,065 A | 9/1981 | Nedelec et al. | |
| 4,305,746 A * | 12/1981 | Hagedorn et al. | 65/106 |
| 4,556,406 A | 12/1985 | Kahle | |
| 4,820,327 A | 4/1989 | Letemps et al. | |
| 5,286,271 A * | 2/1994 | Rueter et al. | 65/106 |
| 5,395,415 A | 3/1995 | Akens et al. | |
| 6,749,926 B1 * | 6/2004 | Yoshizawa | 428/174 |
| 2005/0061032 A1 * | 3/2005 | Yoshizawa | 65/106 |

* cited by examiner

*Primary Examiner* — Queenie Dehghan
(74) *Attorney, Agent, or Firm* — Marshall & Melhorn, LLC

(57) ABSTRACT

A method is provided for shaping a glass sheet in more than one dimension, and within the one or more dimensions forming non-uniform shapes between, for example, the leading edge and the trailing edge of the same glass sheet. Such shaping is achieved by the selective location, in first and second shaping zones, of shaping rolls having first and second shaping configurations and by varying the speed of the glass sheet as it moves through the shaping zones, thus varying the length of time that selected portions of the glass sheet are in contact with certain shaping rolls.

12 Claims, 2 Drawing Sheets

METHOD OF SHAPING GLASS SHEETS

CROSS-REFERENCE TO RELATED APPLICATIONS

This application is claiming the benefit, under 35 U.S.C. §119(e), of the provisional application filed May 12, 2010 under 35 U.S.C. §111(b), which was granted Ser. No. 61/333, 905. This provisional application is hereby incorporated by reference in its entirety.

BACKGROUND OF THE INVENTION

The present invention relates to a method of bending a glass sheet in more than one dimension. More particularly, the invention relates to a method of bending a heated glass sheet by roll forming such that different bending profiles may be formed in portions of the same glass sheet.

Glass sheets suitable for, for example, vehicle windows are conventionally heated to temperature suitable for shaping and are conveyed therefrom by a conveying system into a first roll shaping zone, where they are conveyed between upper and lower sets of rotating shaping rolls having a first shaping configuration. Each set of upper and lower shaping rolls have complementary shapes so as to allow a glass sheet to pass therebetween, and to take the cumulative shape of the entire set of upper and lower shaping rolls, while still being susceptible to further alterations in shape. In general, shaping in the first roll shaping zone is preferably transverse to the direction of travel of the glass sheet.

It is advantageous to transport the heated glass sheets through the roll shaping zone at as high a speed as practicable to reduce cycle time, and to maintain the glass sheet at a temperature sufficient to allow additional shaping in, for example, an inclined second roll shaping zone. Such additional glass shaping is preferably accomplished by the glass sheet being transported from the horizontal first roll shaping zone, up the slope of the inclined second roll shaping zone which preferably includes, upper and lower shaping rolls having a shaping configuration substantially similar to the first shaping configuration of the horizontal roll shaping zone. Shaping in the inclined second roll shaping zone is, primarily, longitudinal, that is, generally parallel to the direction of travel of the glass sheet.

Bending a heated glass sheet by roll forming is known in the patent literature, for example:

U.S. Pat. No. 3,545,951 describes a plurality of arcuately curved rods mounted for rotation each about its own chordal axis. The axes are said to be coplanar, parallel and spaced, and the rods are said to be interconnected for pivoting in unison each about its own axis, from a first position, wherein they are said to be coplanar in a common plane through all axes, to a second position wherein they are said to conjointly define a curved surface whose curvature is variable in dependence upon the angle of rotation of the rods. Sheets said to be in bendable form are moved onto the rods in the first position. The rods are then pivoted to the second position and shaping means complementary to the curved surface defined by the rods are pressed down onto the sheet to conform it to the rods, while the sheet moves continuously, and after shaping, passes to a cooling and tempering chamber or other processing procedure.

U.S. Pat. No. 4,054,037 describes a sheet to be curved, such as glass at a softening temperature, being advanced on a fixed curved bed formed by a series of curved rods having different angles of inclination to form an ascending convex bed with an increasing curvature profile. The sheet is thus gradually raised and simultaneously curved by sagging of the edges thereof. The curved rods are said to have aligned end sections mounted in the same horizontal plane and the inclinations progressively increase. The bed is followed by a bed of constant curvature profile formed by curved rods having the same inclination. Means are said to be provided for independently adjusting the inclination of each rod. Particular ranges of spacing and rate of advance are said to be given.

U.S. Pat. No. 4,123,246 describes shaped solid members such as successive rotating shaping rolls of predetermined contour of a uniform cylindrical or curved configuration which engage a heat-softened glass sheet along an arcuate longitudinal path of substantially constant radius of curvature along forming and quenching conveyors to impart a desired longitudinal component of curvature to the glass and to convey the shaped glass past cool blasts that harden the glass surfaces. The arcuate path is said to be arranged in such a manner that its upward slope at its downstream end is said to be limited to one at which glass sheets move forward toward the cooling conveyor without slipping. A set of at least three special quench rolls forms an upwardly sloped transition conveyor section of constant maximum slope that replaces the downstream portion of the arcuate path where the upward slope would increase to a slope where slippage would take place. The special transition quench rolls are located downstream of the location where blasts of tempering fluid applied at the quenching section have hardened the major glass sheet surfaces sufficiently to, desirably, avoid their distortion by engagement with the rotating special transition quench rolls.

U.S. Pat. No. 4,292,065 describes a method and apparatus for bending sheets in the plastic state, such as sheets of glass at their softening temperature in two directions. The apparatus comprises a first bed of arcuate rods which can be positioned to impart a transverse curvature to the sheet and a second bed of arcuate rods which can be positioned to impart a longitudinal curvature to the sheet. Advantageously, the bending is performed in a heated enclosure at a temperature at least equal to that at which the sheet is later tempered.

U.S. Pat. No. 4,556,406 describes a roll forming apparatus for shaping heat-softened glass sheets into a configuration having a longitudinal radius of curvature that varies in a direction transverse to the glass sheet. The first end of a first traversing cylindrical roll, and a first and second series of longitudinally spaced and transversely extending forming rolls is mounted so that a longitudinal edge of the glass sheet is positioned along a first continuous arcuate path defining a first longitudinal radius of curvature and a second end of each roll is mounted such that an opposing longitudinal edge of the glass sheet is positioned along a second continuous arcuate path defining a second longitudinal radius of curvature. The first and second longitudinal radii are said not to be equal so that a set of upper forming rolls overlays the second series of forming rolls and have a complementary overlying shape.

U.S. Pat. No. 4,820,327 describes bending a heated glass plate by moving it over a bed of rollers defining a path curved along the direction of movement of the glass plate so as to define an upwardly facing concavity. The glass plate moves with a speed of at least 10 cm/sec and is curved by the bed without contact from above. The glass plate is subsequently tempered.

U.S. Pat. No. 5,395,415 describes a method and apparatus for precisely shaping heated glass sheets as the sheets advance along a bed of conveyor rolls. The conveyor rolls comprise a core member having axially aligned opposite sections and an arcuately curved central portion, with a flexible sleeve surrounding the core member. The core members are pivotable in unison between a first position where the curved portions lie in a common plane for conveying the flat sheets and a second, lowered position such that the curved portions define the shape to which the sheets are to be deformed. Vertically reciprocal top surface press units are mounted above the path of the glass sheets. The press units include curved stationary mandrels having freely rotatable flexible sleeves thereon. The configurations of the mandrels are said to be such that in operative position, the mid-portion of the first press unit is slightly closer to the path defined by the conveyor rolls than the edge portions, and the edge portions of the second mandrel are said to be slightly closer to the path than the mid-portion.

Notwithstanding the previously known roll forming methods, it would be advantageous to provide an apparatus and a method that would allow forming non-uniform shapes in a single sheet of glass, for example, forming different shapes of the leading and trailing edges of a glass sheet, by a roll forming process that meets the requirements of high-volume glass manufacturing.

SUMMARY OF THE INVENTION

The invention relates to a method of shaping glass sheets in more than one dimension. More specifically, the invention relates to shaping glass sheets in two dimensions, and within one or both dimensions, forming non-uniform shapes. For example, in a preferred embodiment, the shape of a leading edge of the glass sheet may differ from the shape of the trailing edge of the same glass sheet.

The present invention utilizes a glass shaping system typically having as major components: a glass heating furnace, followed by a substantially horizontal first roll shaping zone, followed by an inclined second roll shaping zone. In accordance with the method of the invention, the glass sheet is conveyed through the first and second shaping zones in a continuous, uni-directional manner.

The invention may include providing one or more pairs of upper and lower shaping rolls having a first shaping configuration and, at one or more selected locations preferably in the first roll shaping zone, providing one or more pairs of upper and lower shaping rolls having a second shaping configuration different from the first shaping configuration. More particularly, the upper and lower shaping rolls of the shaping rolls of the first shaping configuration have substantially the same shape/degree of curvature. By contrast, the upper and lower rolls of the shaping rolls of the second shaping configuration have different shapes/degrees of curvature, one from the other.

As previously indicated, it is generally desirable to transport the glass sheet through the horizontal first roll shaping zone at as high a speed as practicable, however, it has been found to be desirable to vary the speed at which the heated glass sheet is traveling through the first roll shaping zone to selectively influence the roll shaping which occurs. For example, it may be beneficial to reduce the speed of the shaping rolls so that some portions of the glass sheet are in contact with the shaping rolls having a second shaping configuration, for a longer time, thus creating a shape somewhat different than if the glass sheet is travelling at a higher speed with a shorter contact time with the shaping rolls having the second shaping configuration. By the placement of the shaping rolls having the second shaping configuration and the timing of the reduction in the speed of the shaping rolls, and thus the speed of the glass sheet, differentiated shapes in different portions of the same glass sheet can be created.

BRIEF DESCRIPTION OF THE DRAWINGS

The above, as well as other advantages of the present invention, will become readily apparent to those skilled in the art from the following detailed description when considered in light of the accompanying drawings in which.

DETAILED DESCRIPTION OF THE INVENTION

The invention relates to a method of shaping glass sheets in more than one dimension and, more specifically, forming within the more than one shaping dimension different shapes in a single glass sheet. In a preferred embodiment, the configuration of the leading edge of the glass sheet may be made to differ from the trailing edge of the same glass sheet.

According to the method of the invention, a glass sheet is providing having a leading edge and a trailing edge, the glass sheet being at a temperature so as to be shapeable. The glass sheet is conveyed through a first shaping zone that defines a generally horizontally-disposed path for the glass sheet, the first shaping zone comprising paired sets of upper and lower shaping rolls, a plurality of the shaping rolls in the first shaping zone having a first predetermined shaping configuration and one or more other shaping rolls in the first shaping zone have a second predetermined shaping configuration that is different from the first predetermined shaping configuration. The speed at which the glass sheet is conveyed is changed at least once as it is conveyed through the first shaping zone. The glass sheet is then conveyed through a second shaping zone that defines a path for the glass sheet that is upwardly inclined relative to the path defined by the first shaping zone, the second shaping zone comprising paired sets of upper and lower shaping rolls having the first predetermined shaping configuration.

Figure 1:
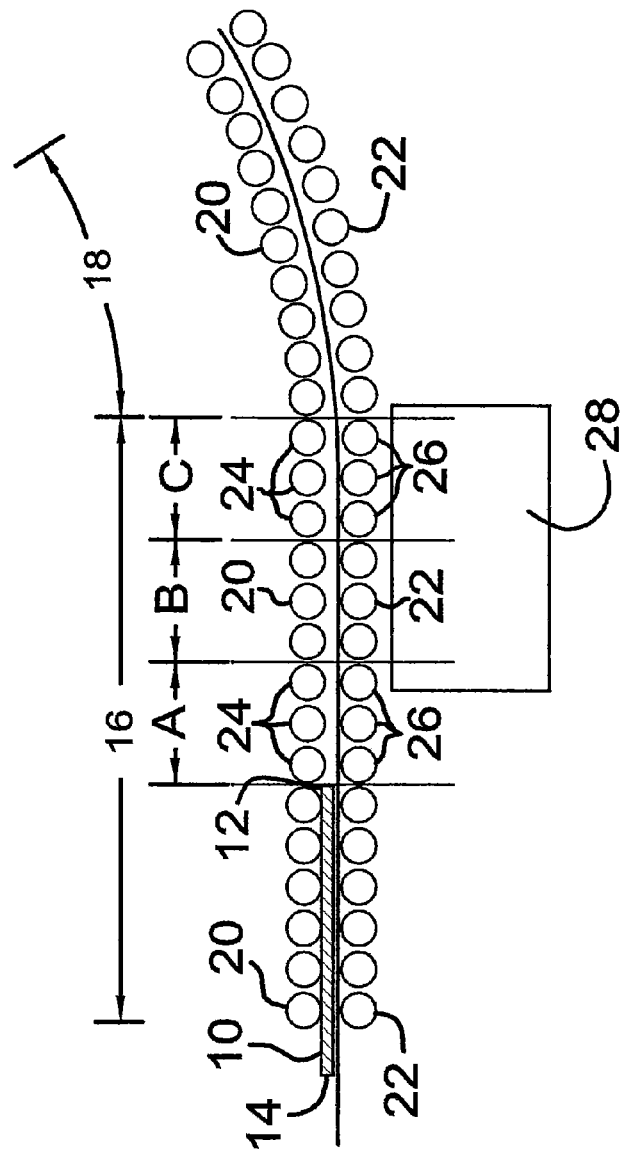
FIG. 1 is a sectional, somewhat schematic view of the roll forming system of the present invention.
Figure 2:
FIG. 2 is a profile view of shaping rolls having a first shaping configuration in accordance with the invention.
Figure 3:
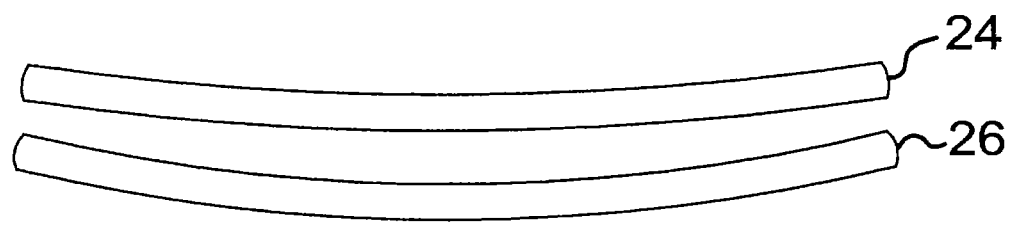
FIG. 3 shows a profile view of shaping rolls having a second shaping configuration in accordance with the invention.

Now referring to the embodiment illustrated in FIG. 1, the advantages of the invention are achieved generally by utilizing a glass shaping system which typically has at least (1) a glass heating furnace for heating glass sheets 10 to a temperature sufficient to enable the glass sheets 10 to be shaped, (2) a substantially horizontal first roll shaping zone 16, and (3) a second roll shaping zone 18 which is configured to be at a predetermined incline relative to the first roll shaping zone 16. The incline of the second shaping zone may be curved as illustrated in FIG. 1.

More particularly, typically within the first horizontal shaping zone 16, the shaping system of the invention utilizes one or more pairs of upper and lower shaping rolls 20, 22 having a first shaping configuration and, at one or more selected locations within the first shaping zone, one or more pairs of upper and lower shaping rolls 24, 26 having a second shaping configuration different from the first shaping configuration of the rolls 20, 22. More particularly, the upper and lower shaping rolls 20, 22 of the shaping rolls of the first configuration have substantially the same shape/degree of curvature. By contrast, the upper and lower rolls 24, 26 of the shaping rolls of the second shaping configuration have different shapes/degree of curvature, one from the other. For example, the lower shaping roll 26 may have a greater degree of curvature than the upper roll 24, or vice versa. The inventors have found that only small differences in the shapes of the upper and lower rolls 24, 26 can result in significant differences in shapes of different portions of the glass sheet to be shaped.

In addition to the configuration of the shaping rolls just described, the inventors have found, generally, that the shape of a selected portion of the glass sheet 10 to be shaped can be further altered by varying the contact time t between one or more portions of the glass sheet 10 with the selectively configured shaping rolls 20, 22, 24, 26 of the present system. The contact time between the glass sheet 10 and a given set of shaping rolls is influenced by the rotational speed of the shaping rolls, which in turn influences the speed of the glass sheet 10 as it is transported between the various sets of shaping rolls 20, 22, 24, 26. The present system is controlled by conventional mechanical and electrical means (not shown) to allow for variations in the rotational speed of any of the shaping rolls, but preferably the rotational speed of the shaping rolls 24, 26 having the second shaping configuration can be varied so as to cause the glass sheet being transported therebetween to vary between, for example, speed $S_1$ and speed $S_2$, which speed $S_2$ is less than speed $S_1$. Speed $S_1$ may preferably be between 0.3 m/sec. and 1.0 m/sec., while speed $S_2$ may preferably be between 0.05 m/sec. and 0.3 m/sec. Increases and decreases in the speed of the glass sheet 10 may be triggered by either the leading edge of the glass sheet 12, or the trailing edge of the glass sheet 14.

A decrease in speed of the glass sheet 10, as previously noted, desirably translates into an increase in the contact time t between the leading edge of the glass sheet 12 and/or the trailing edge of the glass sheet 14 and shaping rolls 24, 26, preferably having the second shaping configuration. Such contact time t at speed $S_2$ may preferably be on the order of 1.5 sec. to 3.0 sec., whereas contact time t with the shaping rolls when glass sheet 10 is traveling at higher speed $S_1$ is on the order of 0.5 sec. to 1.5 sec. Such modest increase in contact time t can, the inventors have found, cause significant changes in glass shape while having little adverse effect on the overall cycle time for shaping a given glass sheet. The method of the invention also provides significant flexibility in the number of different vehicle windows which can be formed on the system without making major changes to the primary components thereof.

To more clearly define the invention, it is useful to conceptually divide the first shaping zone into sub-zones, here called sub-zones A, B and C, as illustrated in FIG. 1. As will be appreciated by those skilled in the art of roll forming, to achieve the aforementioned objectives of the invention, various combinations of shaping rolls 20, 22, 24, 26 having the first shaping configuration and those having the second shaping configuration may be utilized. For example, sub-zone A of the first shaping zone 16 may preferably include shaping rolls 24, 26 having the second shaping configuration while sub-zones B and C may preferably include shaping rolls 20, 22 having the first shaping configuration. Alternatively, it may be useful to place shaping rolls 24, 26 having the second shaping configuration in sub-zone C, while the shaping rolls 20, 22 in sub-zones A and B have the first shaping configuration. In yet another alternative, sub-zones A and C may contain shaping rolls 24, 26 having the second shaping configuration, while sub-zone B may contain shaping rolls 20, 22 having the first shaping configuration. Of course, other combinations of shaping roll configurations may be possible depending upon the particular application and are within the scope of the invention.

The shaping rolls 20, 22, 24, 26 may be made from any suitable material; however, a metal material is preferred. The shaping rolls may be solid or tubular, i.e., having some open space within an outer wall of the roll. Solid shaping rolls are preferred. Steel is an especially preferred material for forming the shaping rolls. Coverings for various purposes may be used to cover the outer surface of the shaping rolls, e.g., thermally resistant and abrasion resistant materials such as fiberglass, stainless steel mesh and the like.

Selective cooling of the glass sheet 10 may also take place in the first shaping zone 16 by any conventional means, but preferably by the application of cooling air directed through one or more cooling or quench modules, represented schematically in FIG. 1 by the reference number 28.

Examples of possible specific methods of operation of the present roll forming system, as generally described earlier herein, will now be provided.

(1) The speed of the glass sheet 10 prior to entering sub-zone A of the first shaping zone 16 is $S_1$ but upon entry of the trailing edge 12 of the glass sheet 10 into sub-zone A, the speed of the glass sheet 10 is reduced to $S_2$ for a time $t_1$. As the trailing edge 12 of the glass sheet 10 enters sub-zone B it accelerates to speed $S_1$ for time $t_2$, and maintains speed $S_1$ as it travels through sub-zone C for time $t_3$. This results in a glass sheet having a greater transverse curvature on the leading edge of the glass sheet than on the trailing edge of the glass sheet.

(2) The speed of the glass sheet 10 prior to entering sub-zone A of the first shaping zone 16 is $S_1$. In this example, the trailing edge 12 of the glass sheet 10 remains at substantially speed $S_1$ as it moves through sub-zones A and B for times $t_4$ and $t_5$, but upon entry of the leading edge 14 into sub-zone C, its speed is reduced to $S_2$ for time $t_6$. This results in a glass sheet having a greater transverse curvature on the trailing edge of the glass sheet than on the leading edge of the glass sheet.

(3) The speed of the glass sheet 10 prior to entry into the first shaping zone 16 is $S_1$, but as the trailing edge 12 of the glass sheet 10 enters sub-zone A, the speed of the glass sheet 10 is reduced to $S_2$ for time $t_7$, accelerates to speed $S_1$ as the trailing edge 12 moves through sub-zones B and C for times $t_8$ and $t_9$, but as leading edge 16 of the glass sheet 10 enters sub-zone C, the speed of the glass sheet 10 is again reduced to speed $S_2$ for time $t_{10}$ and then accelerates to speed $S_1$, as the glass 10 sheet moves into the second shaping zone 18 for a time $t_{11}$. This results in a glass sheet having substantially the same transverse curvature on the leading and the trailing edges of the glass sheet.

As previously mentioned, the second shaping zone 18 is preferably arranged at a predetermined incline relative to the first substantially horizontal shaping zone 16. With such an arrangement, the glass sheet 10 can, in one operation be bent in a plane substantially transverse to its direction of movement, in a plane substantially longitudinal to its direction of movement, and as described herein, to various degrees in such planes in different portions of the same glass sheet.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of shaping glass sheets by roll forming in more than one dimension comprising:
   providing a glass sheet having a leading edge and a trailing edge, the glass sheet being at a temperature so as to be shapeable;
   conveying the glass sheet through a first roll shaping zone that defines a horizontally-disposed path for the glass sheet, the first shaping zone comprising paired sets of upper and lower shaping rolls, a plurality of the shaping rolls in the first shaping zone having a first predetermined shaping configuration and one or more other shaping rolls in the first shaping zone have a second predetermined shaping configuration that is different from the first predetermined shaping configuration, and wherein the speed at which the glass sheet is conveyed is changed at least once as it is conveyed through the first shaping zone; and then conveying the glass sheet through a second roll shaping zone that defines a path for the glass sheet that is upwardly inclined relative to the horizontally-disposed path defined by the first shaping zone, the second shaping zone comprising paired sets of upper and lower shaping rolls having the first predetermined shaping configuration.

2. The method of claim 1, wherein the speed at which the glass sheet is conveyed is reduced at least once for a period of time as it is conveyed through the first shaping zone.

3. The method of claim 2, wherein after the speed at which the glass sheet is conveyed has been reduced for a period of time, the speed at which the glass sheet is conveyed is increased at least once.

4. The method of claim 1, wherein the first shaping zone defines a sub-zone B comprising paired sets of upper and lower shaping rolls having the first predetermined shaping configuration and a sub-zone A comprising paired sets of upper and lower shaping rolls, a plurality of which have the second predetermined shaping configuration.

5. The method of claim 4, wherein the first shaping zone further defines a sub-zone C comprising paired sets of upper and lower shaping rolls, a plurality of which have the second predetermined shaping configuration.

6. The method of claim 1, wherein the first shaping zone defines sequential sub-zones A, B, and C, wherein sub-zones B and C comprise paired sets of upper and lower shaping rolls having the first predetermined shaping configuration and sub-zone A comprises paired sets of upper and lower shaping rolls, a plurality of which have the second predetermined shaping configuration.

7. The method of claim 1, wherein the first shaping zone defines sequential sub-zones A, B, and C, wherein sub-zones A and B comprise paired sets of upper and lower shaping rolls having the first predetermined shaping configuration and sub-zone C comprises paired sets of upper and lower shaping rolls, a plurality of which have the second predetermined shaping configuration.

8. The method of claim 1, wherein the first shaping zone defines sequential sub-zones A, B, and C, wherein sub-zone B comprises paired sets of upper and lower shaping rolls having the first predetermined shaping configuration and sub-zones A and C comprise paired sets of upper and lower shaping rolls, a plurality of which have the second predetermined shaping configuration.

9. The method of claim 1, wherein the first shaping zone defines sequential sub-zones A, B, and C, and wherein the speed of the glass sheet prior to entering sub-zone A is $S_1$, but upon entry of the trailing edge of the glass sheet into sub-zone A, the speed of the glass sheet is reduced to $S_2$, upon entry of the trailing edge of the glass sheet into sub-zone B, the glass sheet accelerates to speed $S_1$ and maintains speed $S_1$ as it travels through sub-zone C.

10. The method of claim 1, wherein the first shaping zone defines sequential sub-zones A, B, and C, and wherein the speed of the glass sheet prior through sub-zones A and B is $S_1$, but upon entry of the leading edge of the glass sheet into sub-zone C, the speed of the glass sheet is reduced to $S_2$.

11. The method of claim 1, wherein the first shaping zone defines sequential sub-zones A, B, and C, and wherein the speed of the glass sheet prior to entering sub-zone A is $S_1$, as the trailing edge of the glass sheet enters sub-zone A the speed of the glass sheet is reduced to speed $S_2$, as the trailing edge of the glass sheet enters sub-zone B the speed of the glass sheet is increased to speed $S_1$, as the leading edge of the glass sheet enters sub-zone C the speed of the glass sheet is reduced to speed $S_2$, and as the trailing edge of the glass sheet leaves sub-zone C the speed of the glass sheet is increased to speed $S_1$ and the speed of the glass sheet is maintained at $S_1$ as it travels through the second shaping zone.

12. The method of claim 1, wherein the paired sets of upper and lower shaping rolls of the first shaping configuration have substantially the same shape/degree of curvature, one to the other, and the paired sets of upper and lower rolls of the shaping rolls of the second shaping configuration have different shapes/degrees of curvature, one from the other.

* * * * *